Figure 1:
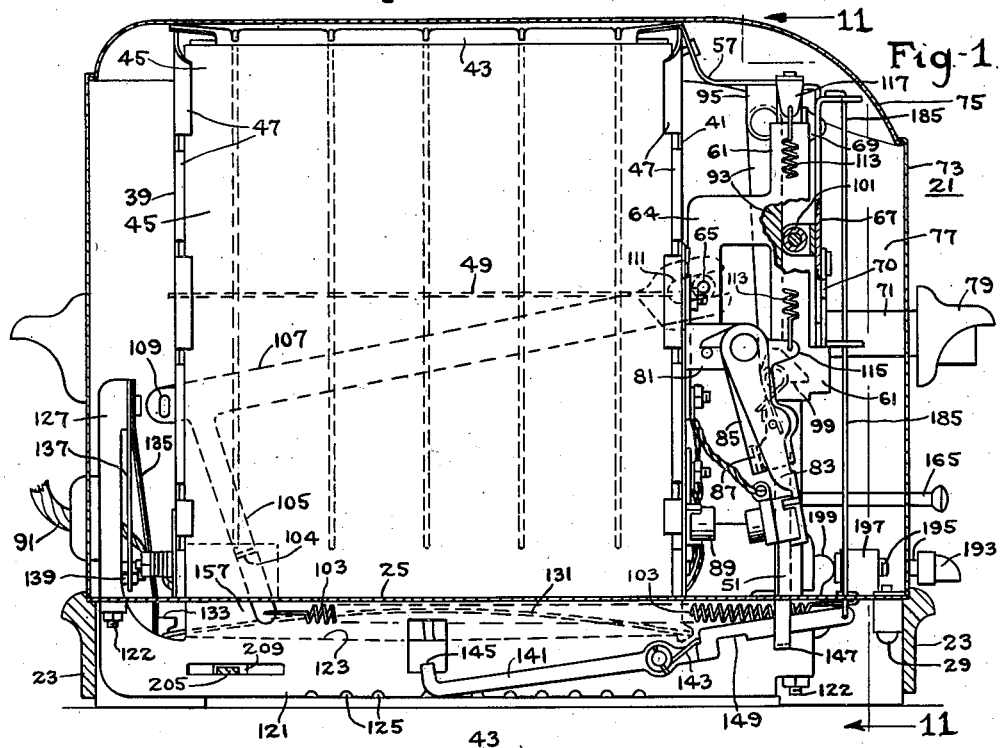

April 9, 1940.  M. IRELAND  2,196,393
AUTOMATIC TOASTER
Original Filed Nov. 5, 1937   5 Sheets-Sheet 1

Inventor
Murray Ireland
By W. M. Biebel
Attorney.

April 9, 1940.   M. IRELAND   2,196,393
AUTOMATIC TOASTER
Original Filed Nov. 5, 1937   5 Sheets-Sheet 2

Inventor
Murray Ireland.
By A. M. Biebel
Attorney.

April 9, 1940. M. IRELAND 2,196,393
AUTOMATIC TOASTER
Original Filed Nov. 5, 1937 5 Sheets-Sheet 3
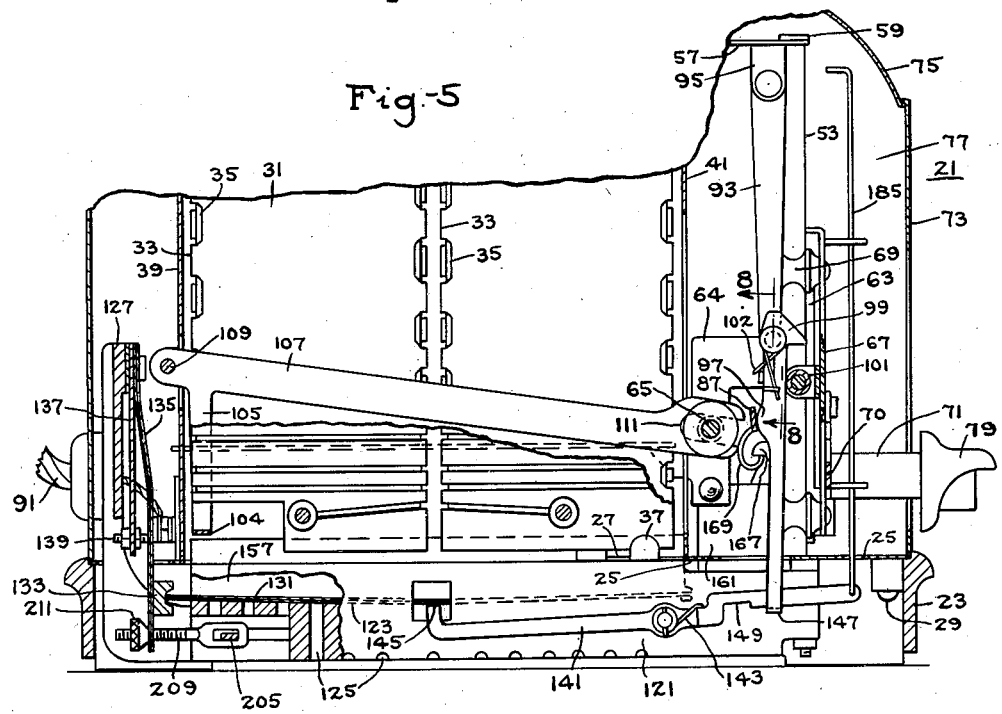
Inventor:
Murray Ireland.
By H. M. Biebel
Attorney April 9, 1940.   M. IRELAND   2,196,393
AUTOMATIC TOASTER
Original Filed Nov. 5, 1937   5 Sheets-Sheet 4

Inventor:
Murray Ireland
By *N. M. Bichel*
Attorney.

April 9, 1940.　　　　M. IRELAND　　　　2,196,393
AUTOMATIC TOASTER
Original Filed Nov. 5, 1937　　　5 Sheets-Sheet 5

Inventor:
Murray Ireland.
By　　　
Attorney

Patented Apr. 9, 1940

2,196,393

UNITED STATES PATENT OFFICE 2,196,393

AUTOMATIC TOASTER

Murray Ireland, near Elgin, Ill., assignor to McGraw Electric Company, Chicago, Ill., a corporation of Delaware Application November 5, 1937, Serial No. 172,986
Renewed May 29, 1939

11 Claims. (Cl. 219—19)

My invention relates to toasters and particularly to automatic electric toasters.

An object of my invention is to provide a relatively simple and effective timing means associated with an electric toaster to first cause opening of a control switch at the end of a toasting operation and then to cause return of a manually movable bread slice support to normal position.

Another object of my invention is to provide a thermally-actuable element, effective when heated during a toasting operation by suitable means, to move in one direction to cause deenergization of the electric heaters of a toaster to terminate a toasting operation, the thermally-actuable element then cooling and causing automatic return of a bread slice support to non-toasting position.

Other objects of my invention will either be apparent from a description of several forms of device embodying my invention or will be hereinafter referred to or set forth in the appended claims.

Figure 2:
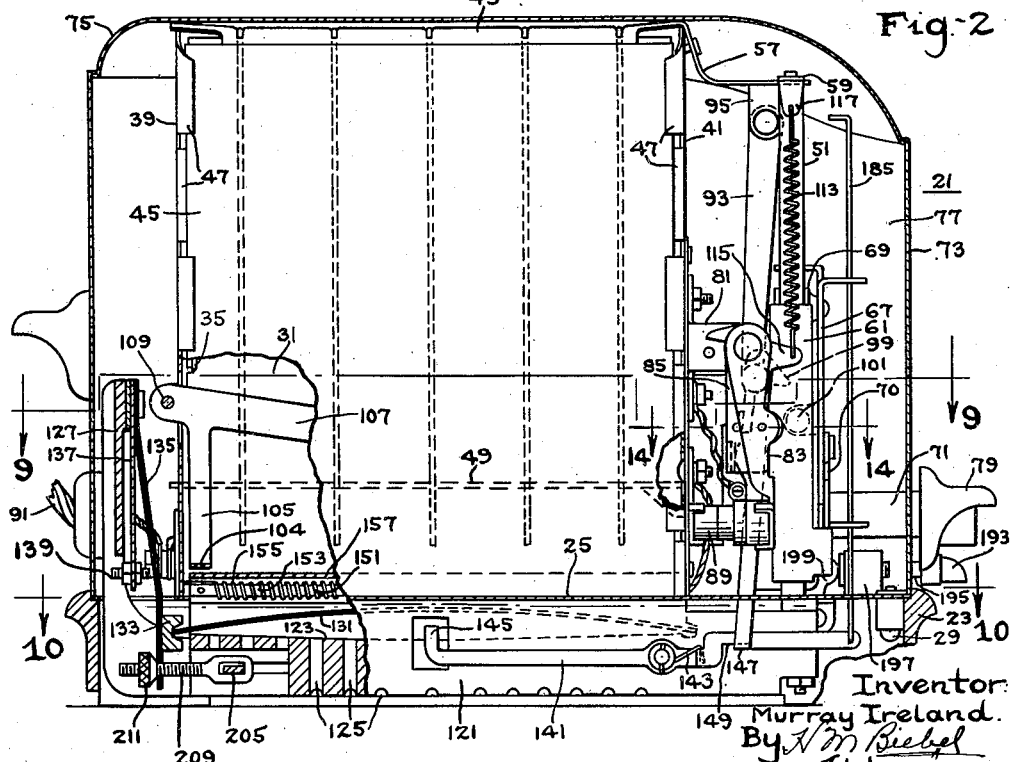
Figure 3:
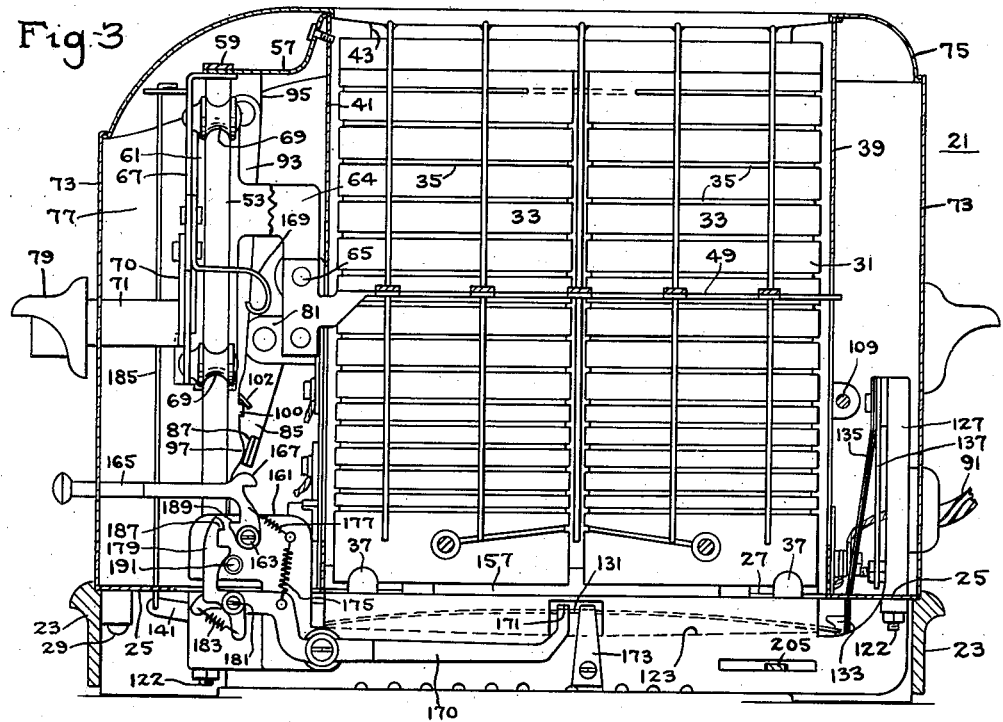
Figure 4:
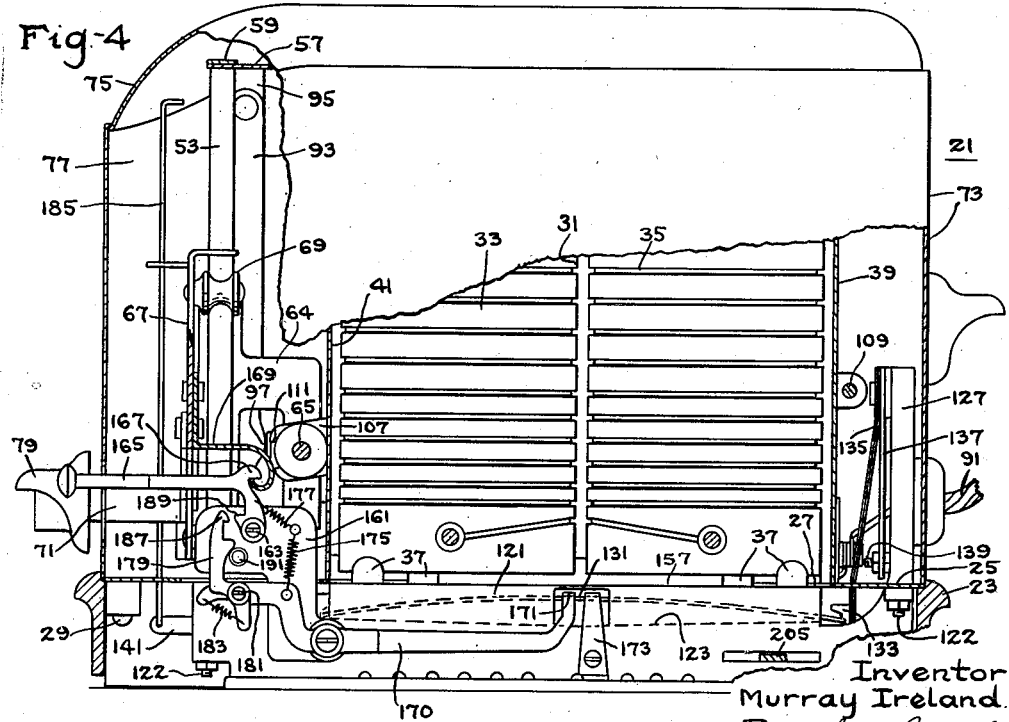
Figure 9:
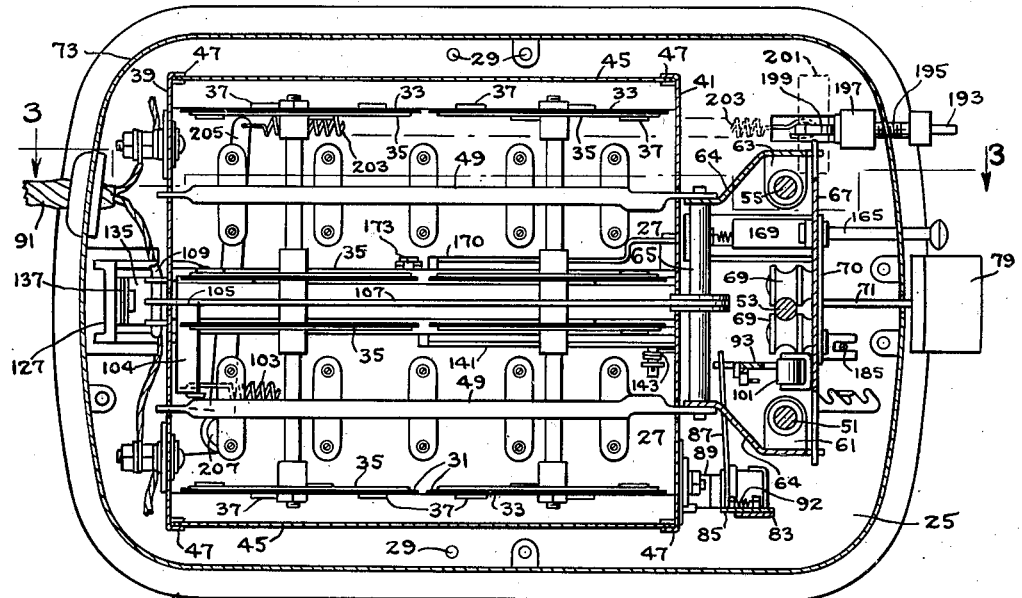
Figure 10:
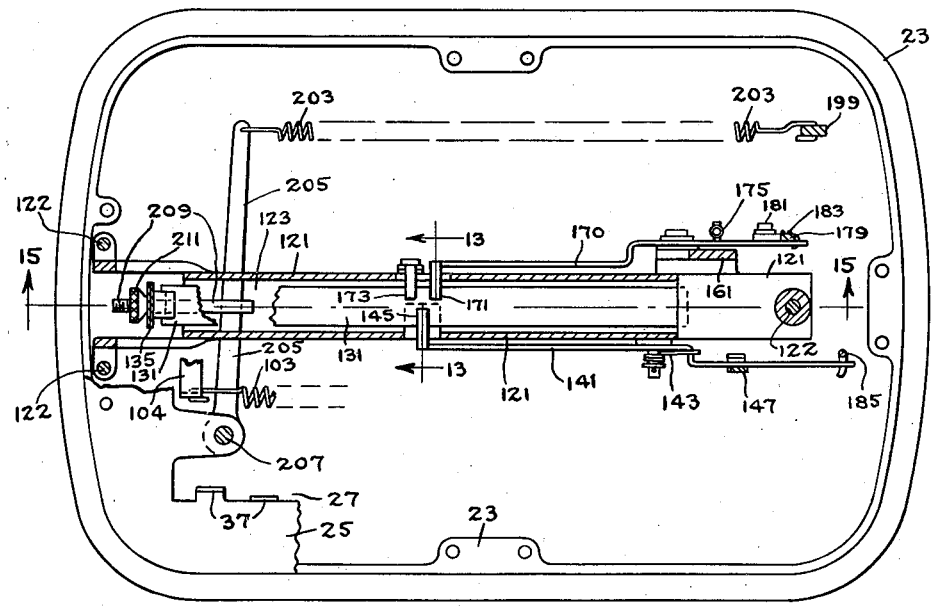
Figure 11:
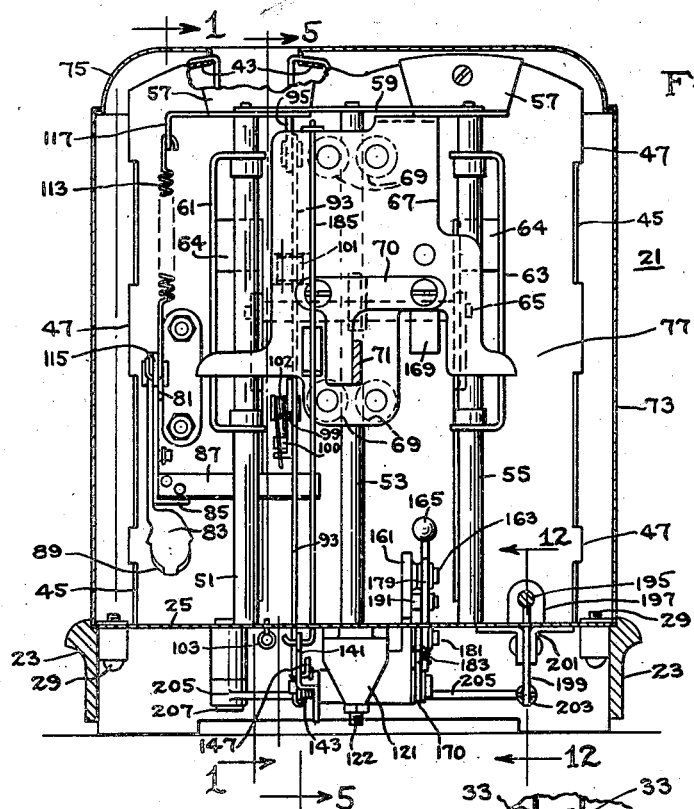
Figure 12:
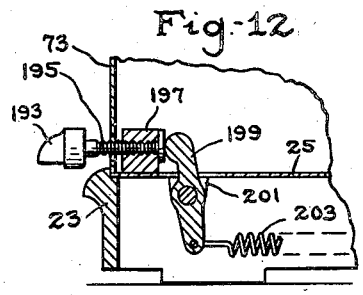
Figure 13:
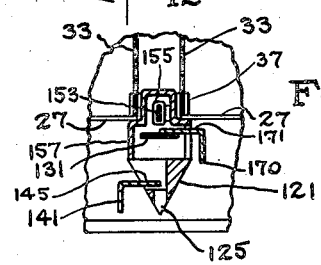
Figure 14:
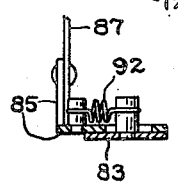
Figure 15:
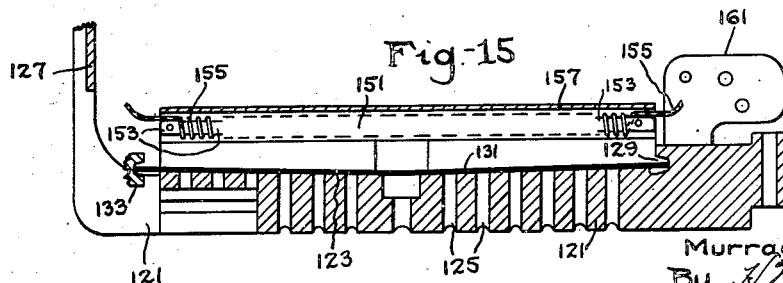

In the drawings,

Fig. 1 is a view in longitudinal vertical section of a toaster embodying my invention, taken on the line 1—1 of Fig. 11 and showing the parts in non-toasting position, Fig. 2 is a view similar to that of Fig. 1 but showing the parts in the positions occupied by them at the beginning of a toasting operation, Fig. 3 is a view in vertical longitudinal section taken on the line 3—3 of Fig. 9 and showing parts in non-toasting position, Fig. 4 is a view similar to that of Fig. 3 showing the parts in the positions occupied by them at the beginning of a toasting operation, Fig. 5 is a view in vertical longitudinal section therethrough taken on the line 5—5 of Fig. 11, but showing the bimetal element in its actuated position, Fig. 6 is a fragmentary longitudinal sectional view similar to that of Figs. 3 and 4 but showing the bimetal element in its actuated position and showing also those parts that are interlocked during the time that the bimetal element remains in its actuated position, Fig. 7 is a fragmentary longitudinal sectional view similar to that of Fig. 6 but showing the bimetal element in the position occupied by it when acting to cause release of the bread slice support, Fig. 8 is an enlarged fragmentary view in vertical section taken on the line 8—8 of Fig. 5, Fig. 9 is an enlarged view in horizontal section therethrough taken on the line 9—9 of Fig. 2, Fig. 10 is a view in horizontal section therethrough taken on the line 10—10 of Fig. 2, Fig. 11 is a view in vertical lateral section therethrough taken on the line 11—11 of Fig. 1, Fig. 12 is a fragmentary view in longitudinal vertical section taken on the line 12—12 of Fig. 11, Fig. 13 is a fragmentary view in lateral vertical section taken on the line 13—13 of Fig. 10, Fig. 14 is a fragmentary view in horizontal section taken on the line 14—14 of Fig. 2, and Fig. 15 is a fragmentary view in longitudinal vertical section taken on the line 15—15 of Fig. 10.

An automatic electric toaster 21 comprises a skeleton base frame 23 which may be made of a suitable molded composition material and which supports a metal base plate 25 which may be provided with a number of horizontal openings 27 therein equal in number to the number of slices of bread adapted to be toasted at one time in the toaster and here shown as two in number. Any suitable means such as a plurality of short machine screws 29 may be used to secure the base plate 25 to skeleton frame 23.

A plurality of pairs of electric heating elements 31 are provided in spaced relation relatively to each other, so that there will be a heating element at each side of a positioned slice of bread. Each heating element includes one or more sheets 33 of electric-insulating material, such as mica, on which is wound a resistor 35. The lower ends of the respective plates 33 of mica may be held by a plurality of upstanding lugs 37 which may be a part of the base plate 25.

The toaster assembly includes further a rear intermediate wall 39 and a front intermediate wall 41, the upper ends of which may be held in proper operative positions relatively to each other by top frame plates 43 suitably secured thereto, while the lower ends of these plates may be held by the metal base plate 25 and rest thereon. The outer heating elements, including particularly the sheets of mica 33, cooperate with the front and rear intermediate walls 39 and 41 to constitute four of the walls of a toasting chamber, all in a manner now well known in the art.

A pair of baffle plates 45 is also provided outside of and spaced from the outermost heating elements, the vertical edges of these plates being held by lateral flange portions 47 on the front and rear intermediate walls.

The toaster assembly includes further a suitable number of bread slice supports 49 which are vertically movable in the toasting chamber, the uppermost position of the bread slice supports 49, as shown in Figs. 1 and 3 particularly, being the non-toasting positions while the position shown in Fig. 2 of the drawings is the toasting position.

Means for guiding and moving the bread slice supports from one to the other of these positions includes a plurality of vertically-extending standards 51, 53 and 55 shown particularly in Figs. 9 and 11 of the drawings and positioned in front of the front intermediate wall 41. The lower ends of these standards may be suitably held by the base plate 25, while the upper ends thereof are maintained in proper operative positions by forwardly extending portions 57 of the top frame plates 43 as well as by a crossbar 59. Standard 51 has slidably mounted thereon a slider 61 while standard 55 has movably mounted thereon a slider 63, these respective sliders being mechanically connected to the respective bread slice supports 49 by connecting portions 64, as shown more particularly in Fig. 9 of the drawings. The rearwardly extending portions 64 of sliders 61 and 63 engage not only with the bread slice supports 49 but also with a suitable laterally-extending rod 65 in order to tie these parts together in substantially fixed positions relatively to each other.

A carriage 67 is vertically movable on standard 53 and carries a plurality of rollers 69 engaging standard 53 to reduce friction therebetween and make it easy to move the carriage and the sliders up and down on the standards. The carriage 67 has end portions overlying parts of the sliders 61 and 63 so that downward movement of the carriage causes downward movement of the sliders and bread slice supports but upward movement of the carriage can be effected independently of the sliders. The carriage 67 has loosely mounted thereon a member 70 having a forwardly extending portion 71 adapted to project through a slot in the front wall of an outer metal casing 73 which is of a kind already well known and used in the art. A cover 75 cooperates wtih the open bottom and open top casing 73 to substantially enclose the sides and the top of not only the toasting chamber hereinbefore described but also a mechanism chamber 77 defined more particularly by the front intermediate wall 41 and the front wall of casing 73. Forwardly extending portion 71 is provided with a knob 79 to permit an operator to move the bread slice supports downwardly into toasting position.

A bracket 81 is insulatedly mounted on and forwardly of front intermediate wall 41, on which is pivotally mounted a contact arm 83 which is shown more particularly in Figs. 1 and 2 of the drawings. An auxiliary arm 85 is also pivotally mounted on bracket 81 coaxially with contact arm 83. Arm 85 has secured thereto a laterally extending bar 87 which is actuated by means to be hereinafter described to cause a turning movement in a clockwise direction of arms 85 and 83 when the carriage and the sliders are moved downwardly to cause contact arm 83 to engage a fixed contact member 89 insulatedly mounted on front intermediate wall 41. These two contacts are connected in circuit with the plurality of heating elements hereinbefore described and with a twin conductor cord 91 of the usual kind whereby to control energization of the heating elements of the toaster. The arms 83 and 85 may be resiliently connected by a coil spring 92 (see Fig. 14) in such manner that movement of arm 85 on its pivot pin will cause movement of switch arm 83, the resilient connection being such as to allow some relative movement therebetween to insure close operative engagement between the cooperating contact members of the switch.

Means actuated by the carriage when moving downwardly to cause closing movement of switch arm 83 comprises a depending lever arm 93 pivotally mounted as on a bracket 95 which may be a part of one of the portions 57. This lever is provided with a rearwardly extending cam projection 97 intermediate its ends and shown particularly in Figs. 3, 4 and 5 of the drawings, which cam projection is adapted to engage bar 87 hereinbefore described. Arm 93 has pivotally mounted thereon an over-running actuator 99 having an upper angular cam surface adapted to be engaged by a roller 101 on carriage 67. Actuator 99 is biased in a clockwise direction against a stop 100 by a spring 102, which stop prevents actuator 99 from turning movement in a clockwise direction, the spring permitting limited turning movement in a counter-clockwise direction. Downward movement of the roller 101 causes it to engage the upper angularly extending cam surface of actuator 99 and forces the arm 93 to turn in a clockwise direction. The roller 101 can ride past the actuator 99, when moving upwardly, causing the actuator to turn momentarily in a counter-clockwise direction and to be returned to its normal position by spring 102.

Means for biasing the bread slice support to its upper or non-toasting position includes a coil spring 103 located below base plate 25, having one end thereof connected to the forward portion of base plate 25 and having its rear end connected to a laterally-extending portion 104 of a short depending arm 105 of a bellcrank lever including in addition to the short arm 105, a long arm 107 extending substantially horizontally of the toaster. This bellcrank lever is pivotally mounted on rear intermediate plate 39 as at 109 shown particularly in Figs. 1 to 5 of the drawings. The forward end of the long arm 107 is provided with a slot 111 which is adapted to receive the intermediate portion of rod 65 so that as the knob 79 is depressed the bellcrank lever is turned in a clockwise direction thereby tensioning spring 103 and biasing the bread slice support to its upper or non-toasting position.

Means for biasing switch arm 83 to its open position (as shown in Fig. 1) includes a coil spring 113 having one end thereof connected to a lug 115 on arm 85, while the other end of coil spring 113 is connected to a portion 117 which may be a part of one of the portions 57 (see Fig. 11).

The toaster includes also an all-thermal timing mechanism to cause automatic termination of a toasting operation, which timing mechanism is so designed and constructed as to vary the duration of a toasting operation in accordance with temperature changes in the toaster. A timing mechanism of this kind is desirable in electric toasters in order that the user need not make any manual adjustments other than he may desire to vary the degree of toasting, that is, light, medium or dark toast.

A longitudinally extending metal beam 121 is suitably supported on and below the base plate 25 as by bolts 122 extending through its end portions to hold it in substantially fixed position in the toaster structure. This member has a slightly concave upper surface 123 and is provided with a plurality of vertical openings 125 therein for a purpose to be hereinafter set forth. I prefer to make this metal member of substantially triangular shape in lateral section so that it may be cooled by an upwardly flowing current of cooling air caused particularly by the heating elements of the toaster when they are energized.

Beam 121 is provided at its rear end with an upwardly extending portion 127. At its forward portion, beam 121 is provided with a recess 129 to receive the forward end of a snap-acting bimetal bar 131, this recess being located slightly above surface 123. The rear end of bar 131 is received in a suitable recess in a block 133 which is supported on a compensating bimetal bar 135, the upper end of which is held by the upper end of extension 127. Means for adjusting the pressure on bimetal bar 135 includes a spring bar 137 having its upper end secured to the upper end of extension 127, its lower end being provided with an adjusting screw 139 adapted to engage bimetal bar 135 and apply a greater or lesser pressure thereagainst to be transmitted to bar 131.

A detent mechanism provided to hold the switch members 83 and 89 in engaged position as shown in Fig. 2 includes a latch arm 141 pivotally mounted intermediate its ends on beam 121 as shown particularly in Figs. 1, 2 and 5 of the drawings and is biased in a clockwise direction by a spring 143. Arm 141 is provided at its inner end with an upwardly and laterally extending portion 145 located below bimetal bar 131 and adapted to be moved thereby in a counterclockwise direction when bimetal bar 131 snaps over into the position shown in Figs. 5 and 6 of the drawings upon being heated to a predetermined temperature. Arm 93 is provided with a lateral extension 147 at its lower end adapted to cooperate with a recess 149 in the lower edge of the right-hand portion of arm 141. Thus, when arm 93 is turned in a clockwise direction as has hereinbefore been set forth its extension 147 will interfit with arm 141 and be located in recess 149 to thereby hold the contact arm 83 in engagement with fixed contact member 89.

Means for thermally energizing the bimetal bar 131 independently of heat from the main heaters may include an auxiliary heating element 151 shown particularly in Figs. 13 and 15 of the drawings. This auxiliary heating element extends longitudinally of the toaster and a small distance above the bimetal bar 131 and may be of any suitable and desired kind including an insulated or insulating support 153 and a resistor 155 wound thereon which resistor may either be of the type adapted to be connected in series circuit with the main heating elements or may be of the type connected in shunt therewith, but its energization is controlled by the switch, comprising switch arm 83 and fixed contact 89.

A cover for the auxiliary heating element and the bimetal bar 131 is also provided and includes a member 157 of any suitable material and of substantially channel-shape in lateral section, a preferred form of this cover being shown in Fig. 13 of the drawings. The bimetal bar 131 is therefore screened against thermal action by the main heating elements of the toaster, its thermal energization being effected substantially altogether by the auxiliary heater 151.

The front end of beam 121 is provided with an upwardly extending portion 161 having a flat surface at one side thereof to receive a pivot pin 163 of a latch release lever 165 pivotally mounted on pin 163. This lever 165 may be of the shape shown in Figs. 3 and 4 of the drawings, for instance having a detent 167 at its inner end to receive a catch 169 on slider 63. Forward end of lever 165 extends outwardly through the front wall of casing 73 to permit of manual control of the toaster.

A second latch arm 170 is pivotally mounted intermediate its ends on that side of beam 121 opposite to the side on which arm 141 is pivotally mounted. The right-hand end portion of arm 170 (as seen in Figs. 3 and 4) is provided with an upwardly and inwardly extending portion 171, the extreme end of which is adapted to overlie bimetal bar 131. It may be noted particularly by reference to Figs. 3 and 4 of the drawings that the mid-portion of bimetal bar 131 is adapted to engage a stop member 173 to limit its upward movement. Arm 170 is biased in a clockwise direction by a spring 175 while lever 165 is biased in a clockwise direction by a spring 177. A detent arm 179 (see Figs. 3 and 4) is pivotally mounted on the left hand end of arm 170 as on a pivot pin 181. Arm 179 is biased in a clockwise direction by a spring 183.

While it is intended that the toaster embodying my invention shall be operated by the hereinbefore described timing mechanism it may become desirable under abnormal conditions to terminate the toasting operation manually, and for this purpose a latch release link 185 is pivotally connected to the forward end of arm 141 and extends upwardly through portions of carriage 67. The upper end of link 185 is bent as shown in Figs. 1 and 2 of the drawings so that when carriage 67 is moved upwardly to the fullest extent of its travel link 185 will be moved upwardly to cause turning movement of arm 141 in a counter-clockwise direction to effect release of arm 93 to thereby permit opening of the switch controlling the energization of the main and the auxiliary heating elements.

The operation of the toaster hereinbefore described is substantially as follows. Let it be assumed that an operator has placed one or two slices of bread on the bread slice supports while they are in their upper or non-toasting positions as shown particularly in Figs. 1 and 3 of the drawings. Downward pressure on knob 79 moves the bread slice supports to their lowered position, tensions biasing spring 103, causes turning movement of arm 93 in a clockwise direction, which causes closing movement of switch arm 83 to energize the heaters, while at the same time removing the upward pressure on link 185 to thereby permit spring 143 to cause a slight turning movement of arm 141 whereby arm 93 is latched in the position shown particularly in Fig. 2 of the drawings.

The energized main heaters cause toasting of the slices of bread in the toasting chamber at each side thereof while the auxiliary heater 151 thermally energizes bimetal bar 131. The cold position of bimetal bar 131 is shown for instance in Fig. 2 of the drawings, that is, it is bowed upwardly. A downward movement of the bimetal bar is desired after a relatively long time, that is, the length of time required to properly toast a slice of bread and the operating characteristics of the bimetal bar 131 and its thermal energization are such as to obtain a snap action movement thereof after such duration of time. The upper surface of beam 121 is slightly concave, as shown particularly in Figs. 5, 6 and 7 of the drawings and the position of the recess 129 and of the recess in abutment 133 relative to the concave surface is such that the bimetal bar 131 is stopped in only slightly downwardly bowed position. This means that a much shorter length of time and a much smaller temperature change in the opposite direction, in this case a cooling, is required to cause the bimetal bar to snap over into substantially its original position. In addition it will be noted that the bimetal bar 131 is in close flat-surface engagement over substantially its entire length with the upper concave surface of beam 121 so that it requires only a few seconds for the bimetal bar to cool to substantially its original temperature and return to its upwardly bowed shape, thereby placing it in proper condition for another cycle.

The downward movement of the upwardly-bowed bimetal bar, upon being heated to a predetermined higher temperature, causes its central portion to engage portion 145 of lever arm 141 to thereby cause it to move slightly in a counter-clockwise direction on its pivot against the lesser biasing force of spring 143. This upward movement of the right-hand portion of arm 141 effects release of arm 93 thereby causing opening movement of switch arm 83 whereby the energizing circuit through the heating elements is interrupted and the toasting operation is terminated.

It will thus be noted that while a toasting operation is terminated by the deenergization of the main heating elements as hereinbefore described, the slices of toasted bread will remain in the toasting chamber for a few seconds longer before they can be easily and quickly removed by an operator. The appearance of the upper portion of the respective slices of bread above the casing is therefore a signal to the user that he can remove the toast thus prepared as well as a signal that the toaster is ready for another toasting operation.

The downward snap action of bimetal bar 131 has permitted turning movement of arm 170 in a clockwise direction under the influence of spring 175 thereon, whereby detent arm 179 has been moved slightly upwardly and a detent portion 187 at its upper end has engaged a cooperating lug 189 on lever 165. It may be noted that member 179, while being biased in a clockwise direction by spring 183, was prevented from moving in that direction by a pin 191 on extension 161. When arm 170 is turned in a clockwise direction, member 179 is moved into the position shown particularly in Fig. 6 of the drawings, that is, this mechanism is now ready to cause a counter-clockwise movement of lever 165 under the following conditions. As has been hereinbefore stated bimetal bar 131 cools relatively quickly and when it has been cooled to a predetermined degree it will quickly snap into its initial or upwardly bowed position as shown for instance in Fig. 7 of the drawings. This upward movement of the bimetal bar 131 causes turning of arm 170 in a counter-clockwise direction (as seen in Figs. 3 and 4, thereby causing a downward movement of detent arm 179 and a corresponding turning movement of lever 165 as shown particularly in Fig. 7 of the drawings whereby the bread slice supports and their associated parts are released from detent 167, spring 103 causing a quick upward movement of the bread slice supports into non-toasting position.

It is of course highly desirable that a toaster of this kind have means for varying the degree of toasting of a given kind of bread as well as be able to toast different kinds of bread. Means provided for this purpose includes a knob 193 mounted on the outside of the casing on a shaft 195 which shaft is provided with screw threads and extends through an internally screw threaded bearing block 197 supported on base plate 25 (see Fig. 12). The inner end of shaft 195 engages a pivot arm 199 suitably supported in a bracket 201 depending from base plate 25, the lower end of arm 199 having secured thereto one end of a coil spring 203. The other end of spring 203 is connected to the end of a lever arm 205 suitably pivotally supported as by a pivot pin 207, supported by and below base 25. Lever arm 205 extends through a transverse opening at one end of a link 209, the other end of which is screw threaded and extends through an opening in the lower end portion of compensating bimetal bar 135, an adjusting nut 211 being mounted on the outer end of link 209 to permit of manual adjustment of the initial compression applied to the main bimetal bar 131. Thus, if knob 193 be turned to increase the tension on spring 203, a greater compression will be applied to the bimetal bar 131 and consequently a greater rise of its temperature must occur before it will snap over as described above. This, of course, means that the duration of a toasting operation is increased, resulting in a greater degree of toasting.

The operation and effect of the auxiliary bimetal bar 135 is substantially as follows; bimetal bar 135 is subjected to the temperature of the toasting chamber and its temperature will therefore vary with the temperature of the toasting chamber and is so arranged that it will tend to flex in a clockwise direction (as seen in Figs. 1, 2 and 5) with increase in temperature, thereby reducing the compression applied to the main bimetal bar 131 and permitting said bar to snap over, as described above, sooner than when it and the toaster are at a lower temperature. The duration of a toasting operation when the toaster is hot, because of having been used one or more times, is therefore less than for the first operation starting with a cold toaster, and it is easily possible to so adjust and correlate the various parts of a toaster of this kind that uniform toasting of successive slices of bread is obtained.

Various modifications may be made in the device embodying my invention without departing from the spirit and scope thereof, and I desire therefore, that the appended claims shall be limited only by the prior art.

I claim as my invention:

1. In an automatic toaster, the combination with an electric heating means, a control switch therefor biased to open position, a bread slice support movable to toasting and non-toasting position and biased to non-toasting position, manually-actuable means for simultaneously moving the bread support to toasting position and the switch to closed position, detent means for holding the switch in closed position and separate detent means for holding the bread support in toasting position, an auxiliary electric heater, the energization of which is controlled by said control switch and a bimetal element thermally controlled by said auxiliary electric heater and movable in a given direction for effecting release of the switch holding detent and termination of the toasting operation, of means normally held out of engagement with said bread-support-holding-detent by said bimetal element but movable into operative relation with said bread-support-holding-detent when said bimetal element moves in said given direction and actuated by the bimetal element when it moves in the opposite direction to cause release of the bread-support-holding-detent and return of the bread support to non-toasting position.

2. In an automatic toaster, the combination with an electric heating means, a control switch therefor biased to open position, a bread slice support movable to toasting and non-toasting positions and biased to non-toasting position, manually-actuable means for simultaneously moving the bread support to toasting position and the switch to closed position, detent means for holding the switch in closed position and separate detent means for holding the bread support in toasting position, an auxiliary electric heater, the energization of which is controlled by said control switch, a bimetal bar heatable by said auxiliary electric heater and movable in a given direction for effecting release of the switch holding detent and termination of a toasting operation and means located in the path of travel of said heated bimetal bar for limiting the amount of travel of the bimetal bar in said given direction and for causing rapid cooling thereof, of mechanical means normally held out of operative relation with said bread-support-holding-detent by said bimetal bar and spring means for moving said mechanical means into operative engagement with said bread-support-holding-detent on movement of said bimetal bar in said given direction, said mechanical means being movable in the opposite direction to cause releasing movement of said bread support detent and return of the bread support to non-toasting position.

3. In an automatic toaster, the combination with an electric heating means, a control switch therefor biased to open position, a bread slice support movable to toasting and non-toasting positions and biased to non-toasting position, manually-actuable means for simultaneously moving the bread support to toasting position and the switch to closed position and separate detent means for holding the switch in closed position and the bread support in toasting position, of means including an auxiliary electric heater the energization of which is controlled by said control switch, a bimetal bar subject to heat from said auxiliary heater and flexing thereby in a given direction for directly mechanically engaging said switch-detent means to cause switch releasing movement thereof after a relatively long time interval constituting the operating period of the toaster and a release lever for the bread support latch normally out of operative relation with the bread support detent but movable into operative relation therewith when the bimetal bar engages said switch detent means and actuated by the bimetal bar when flexing in the opposite direction to cause release of the bread support and return thereof to non-toasting position.

4. In an automatic toaster, the combination with a main electric heating means, a control switch therefor biased to open position, a bread slice support movable to toasting and to non-toasting position and biased to non-toasting position, manually-actuable means having connections for simultaneously moving the bread support to toasting position and the switch to closed position, a first detent for holding said switch in closed position, a second detent for holding said bread support in toasting position and means including a bimetal bar and an auxiliary electric heater thermally associated with said bimetal bar, the energization of said auxiliary electric heater being controlled by said control switch, for causing release of the detent holding said switch in closed position on movement of said bimetal bar consequent to thermal energization by said auxiliary electric heater, after a time interval constituting the operating period of the toaster, of a pivotally mounted lever arm having one end thereof in engagement with said bimetal bar at all times and having its other end out of operative engagement with said bread support detent during the operating period of the toaster and a spring for causing movement of said other end of said lever arm into operative engagement with said bread support detent on movement of said bimetal bar consequent to thermal energization thereof, said lever arm being actuable by said bimetal bar on its return movement after thermal deenergization thereof to cause release of said bread support detent and return of the bread support to non-toasting position.

5. In an automatic toaster, the combination with an electric heating means, a control switch therefor biased to open position, a bread slice support movable to toasting and non-toasting position, and biased to non-toasting position, manually-actuable means for simultaneously moving the bread support to toasting position and the switch to closed position, detent means for holding the switch in closed position, an auxiliary electric heater, the energization of which is controlled by said control switch and a bimetal element subject to heat from said auxiliary electric heater and movable in one direction to effect release of said switch holding detent and termination of the toasting operation, of a second detent means for holding the bread support in toasting position, means normally held out of engagement with said second detent by said bimetal element but movable into operative relation with said second detent when said bimetal element moves in said one direction and actuable by said bimetal element when it moves in an opposite direction to cause release of the second detent and return of the bread support to non-toasting position and manually actuable means on said second detent to effect release of said second detent without opening said control switch.

6. In an automatic toaster, the combination with a casing, an electric heating means therein, a control switch therefor biased to open position, a bread slice support movable to toasting and non-toasting position, and biased to non-toasting position, manually-actuable means for simultaneously moving the bread support to toasting position and the switch to closed position, detent means for holding the switch in closed position, an auxiliary electric heater, the energization of which is controlled by said control switch and a bimetal element subject to heat from said auxiliary electric heater and movable in one direction to effect release of said switch holding detent and termination of the toasting operation, of a second detent means for holding the bread support in toasting position, means normally held out of engagement with said second detent by said bimetal element but movable into operative relation with said second detent when said bimetal element moves in said one direction and actuable by said bimetal element when it moves in an opposite direction to cause release of the second detent and return of the bread support to non-toasting position and manually actuable means on said second detent extending outwardly through said casing for effecting release of said second detent without affecting said first named detent.

7. A device as set forth in claim 4 and including a casing and an arm on said second detent manually actuable from the outside of said casing for effecting release of said second detent and return of the bread support to non-toasting position, during the time when said control switch is in closed position.

8. In an automatic toaster, in combination, an electric toasting element, a bread slice support movable to toasting and non-toasting positions relatively to the toasting element and yieldingly biased to non-toasting position, means to move the bread support to toasting position, a detent for holding the bread support in toasting position and thermal timing means for causing release of said detent after a time interval, said timing means including a single auxiliary electric heater, a single snap-acting bimetal element adapted to be heated by said auxiliary heater, means for supporting the bimetal element for movement in a given direction in response to heating by said auxiliary heater and for movement in the opposite direction in response to cooling, means mechanically actuable by the bimetal element on movement in one of said directions to cause release movement of said detent and a cooling member positioned to be mechanically contacted by the bimetal element when it has moved in said given direction to effect quick cooling of the bimetal element to condition the same to properly control rapidly succeeding toasting operations.

9. In an automatic toaster, in combination, an electric toasting element, a bread slice support movable to toasting and non-toasting positions relatively to the toasting element and yieldingly biased to non-toasting position, means to move the bread support to toasting position, a detent for holding the bread support in toasting position and thermal timing means for causing release of said detent after a time interval, said timing means including a single snap-acting bimetal bar, means for supporting said bimetal bar for movement in a given direction on temperature increase thereof and for movement in the opposite direction on cooling thereof, means to first heat and then cool said bimetal bar, means actuable by the bimetal bar on movement in one of said directions to cause release of said detent and a fixed cooling member positioned to be mechanically contacted by the bimetal bar when it has moved in said given direction to quickly cool the bimetal element to place it in condition to properly control rapidly succeeding toasting operations.

10. In an automatic toaster, in combination, an electric toasting element, a bread slice support movable to toasting and non-toasting positions relatively to the toasting element and yieldingly biased to non-toasting position, means to move the bread support to toasting position, a detent for holding the bread support in toasting position and thermal timing means for causing release of said detent after a time interval, said timing means including a single snap-acting bimetal bar, means for fixedly supporting said bimetal bar relatively to the toaster and for movement in a given direction on temperature increase thereof and for movement in the opposite direction on cooling thereof, means to first heat and then cool said bimetal bar, means actuable by the bimetal bar on movement in one of said directions to cause release of said detent and means comprising a part of the bimetal supporting means positioned to be mechanically contacted by the bimetal bar when it has moved in said given direction to cause quick cooling of the bimetal bar to condition the same to properly control rapidly succeeding toasting operations.

11. In an automatic toaster, in combination, an electric toasting element, a bread slice support movable into toasting and non-toasting positions relatively to the toasting element and yieldingly biased to non-toasting position, means to move the bread support into and hold it in toasting position and a thermal timing device for causing return of the bread support to non-toasting position after a time interval the length of which varies with toaster temperature, said thermal timing device including a single snap-acting bimetal bar adapted to be heated simultaneously with the heating of a slice of bread and to move quickly in a given direction when heated to a predetermined temperature, means mechanically engaged for an appreciable length of time by the bimetal bar at the end of its movement in said given direction to cause it to cool and to move in the opposite direction and means actuable by said bimetal bar in its movement in one of said directions to cause return of the bread support to non-toasting position.

MURRAY IRELAND.